Patented May 14, 1929.

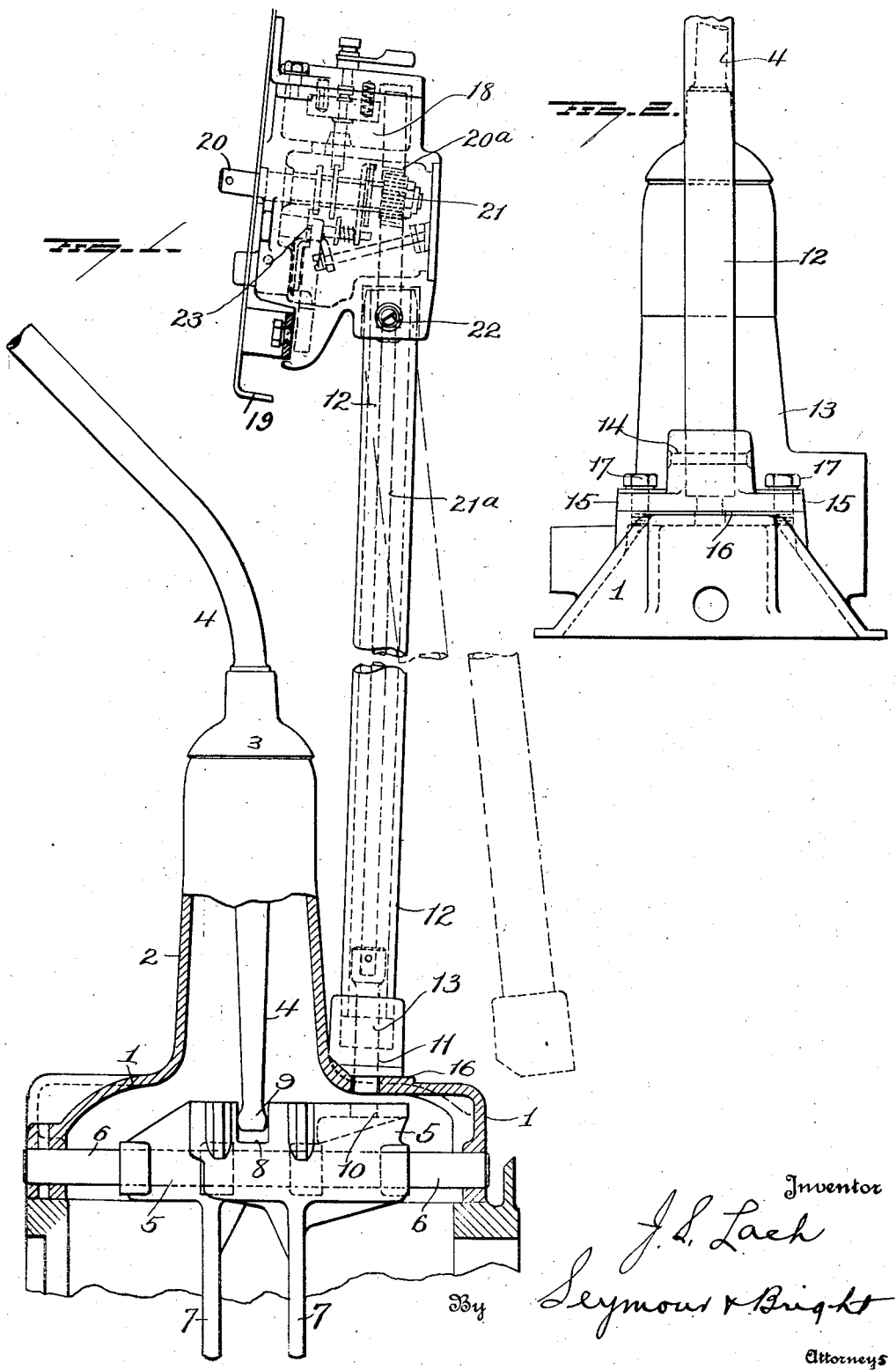

1,713,288

UNITED STATES PATENT OFFICE.

JOSEPH S. LACH, OF BRIDGEPORT, CONNECTICUT, ASSIGNOR TO THE YALE & TOWNE MANUFACTURING COMPANY, OF STAMFORD, CONNECTICUT.

AUTOMOBILE LOCK MEANS.

Application filed August 4, 1926. Serial No. 127,086.

This invention relates to improvements in locking means for automobiles and more particularly to means for locking the transmission mechanism,—one object of the invention being to provide simple and efficient means which shall be controlled by key controlled means to lock the gear shift blocks or members.

With this and other objects in view, the invention consists in certain novel features of construction as hereinafter set forth and pointed out in the claims.

In the accompanying drawings;

Figure 1 is a view partly in section and partly in elevation, showing an embodiment of my invention, and Figure 2 is a view taken at right angles to Figure 1, the key controlled devices being omitted.

The transmission casing of an automobile is indicated at 1, and the transmission gearing (not shown) may be of any approved construction and arrangement in which shiftable gears and clutch means are employed. The casing 1 has mounted thereon a dome member 2 which constitutes a member of the casing, and this dome member provides a mounting at 3 for a shift lever 4, as is well understood in the art. Within the casing member 2, shift blocks or members 5, 5 are mounted to slide on supporting means 6, and these shift blocks or members are provided with arms or engaging means 7, 7 for cooperation with gears of the transmission gearing in the well-known manner. The shift members 5 are also provided with recesses, as indicated at 8 to receive the rounded head 9 at the lower end of the shift lever 4. It will of course be understood that the shift lever is so mounted that it may be moved laterally to cause its head 9 to engage in the recess 8 in one or the other of the shift blocks and that said lever may be moved in a direction to shift one or the other shift block to shift members of the transmission mechanism.

The shifting blocks or members 5, 5, are provided with recesses or sockets 10 which, when the blocks are in neutral positions, are in alinement to form a socket to receive a bolt 11 to lock said blocks and thus prevent their manipulation by the shift lever. The bolt 11 passes through a suitable hole in the casing member 2 and is provided at its upper end with a head which constitutes a plunger movable in the lower portion of a hardened steel armor tube 12. The lower end of this tube enters a socketed bracket or retainer 13 to which it is secured by a rivet 14 and the socket is provided in its bottom with a suitable hole for the accommodation of the bolt. The bracket or retainer 13 is provided with lugs or ears 15 and is mounted on a seat 16 provided on the casing member 2. Bolts 17 passing through the lugs or ears 15 and entering the seat 16 serve to removably secure the bracket or retainer 13 to the casing member 2.

A casing 18 is suitably secured to the instrument board 19 of the car and carries manually operable key-controlled mechanism for controlling the operation of the bolt 11. This operating mechanism may include a manually operable shaft 20 on which a pinion 21 may be secured in position to mesh with a toothed slide or rack bar 20ᵃ. A rod 21ᵃ is pivotally connected at its upper end to the slide 20ᵃ and is housed in the tube 12, the lower end of said rod being secured in a socket in the upper headed end of the bolt 11,—said rod constituting in effect an extension of the bolt. The upper end portion of the tube 12 is pivotally connected at 22, and as the bracket or retainer 13 is removably secured to the transmission casing member 2, said bracket may be detached and the tube, together with the bolt and its extension and said bracket, may be swung laterally as indicated by dotted lines in Figure 1, when the bolt is in retracted position.

The casing 18 contains key-controlled locking mechanism 23 for controlling the operation of the manually operable shaft, but as the specific construction of said key-controlled locking mechanism does not constitute part of my present invention, a detail description is deemed unnecessary.

It is apparent that when the bolt 11 is in normal retracted position, the shift blocks may be manipulated by the shift lever in the well known manner, and that when the bolt 11 is projected so as to have interlocking relation with the shift blocks, the latter will be locked against manipulation, and that the shift lever will also be locked.

Having fully described my invention what I claim as new and desire to secure by Letters Patent, is:—

1. In transmission control means, the combination of shift blocks having bolt receiving portions, a shift lever cooperable with said blocks, a bolt to enter the bolt-receiving portions of said blocks to lock the latter against movement, a slide connected with the upper end of the bolt, a manually rotatable shaft operatively connected with the slide for positively projecting and retracting the bolt, and key-controlled means for controlling the operation of said manually operable means, said key-controlled means being adjacent but independent of the manually operable means.

2. In transmission control means, the combination of a transmission casing member having a bolt hole, shift blocks therein, a bolt to engage and lock said blocks, a bracket removably secured to said casing member and through the bottom of which said bolt is movable, an extension connected with said bolt, an armor tube for said bolt and its extension, means securing said tube to the removable bracket, a casing to be secured to the instrument board of a car, means pivotally connecting the upper portion of said tube to said last-mentioned casing, manually operable means for projecting and retracting the bolt carried by said casing and including a slide member with which the bolt extension has pivotal connection, and key controlled means for controlling the operation of said manually operable means.

3. In transmission control means, the combination of a transmission casing, shift blocks in the casing, a bolt arranged to enter the casing and engage and lock the blocks, a lock casing, a tube pivoted at its upper end to the lock casing and removably secured at its lower end upon the transmission casing, the bolt being guided by and in the tube, an extension rising from the bolt through the tube, a rack slidably mounted in the lock casing and pivoted to the upper end of the extension, the pivotal connection between the slide and the extension being coaxial with the pivotal connection of the tube to the lock casing when the bolt is retracted, a manually operable shaft mounted in the lock casing, a pinion on said shaft meshing with the rack, and key-controlled means in the lock casing for permitting or preventing the operation of said shaft.

In testimony whereof, I have signed this specification.

JOSEPH S. LACH.